JAMES MONTFORT, CUT-OFF VALVE GEAR FOR STEAM-ENGINES, regulated by the GOVERNOR.

NEWBURGH, N.Y.

JUNE 1871.

No. 118,873.

Patented Sep. 12, 1871.

UNITED STATES PATENT OFFICE.

JAMES MONTFORT, OF NEWBURG, NEW YORK.

IMPROVEMENT IN CUT-OFF VALVE-GEARS FOR STEAM-ENGINES.

Specification forming part of Letters Patent No. 118,873, dated September 12, 1871.

*To all whom it may concern:*

Be it known that I, JAMES MONTFORT, of Newburg, in the county of Orange and State of New York, have invented a new Cut-off for Steam-Engines, regulated by the governor; and I do hereby declare that the following is a full, clear, and exact description of the same, reference being had to the accompanying drawing and to the letters of reference marked thereon, in which—

Figure 1:
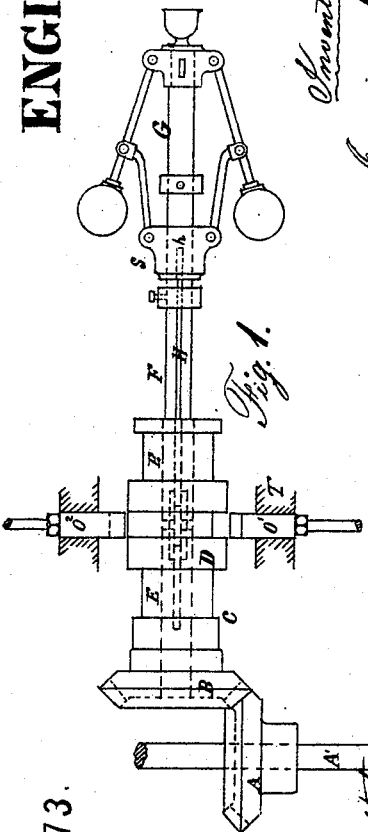
Figure 2:
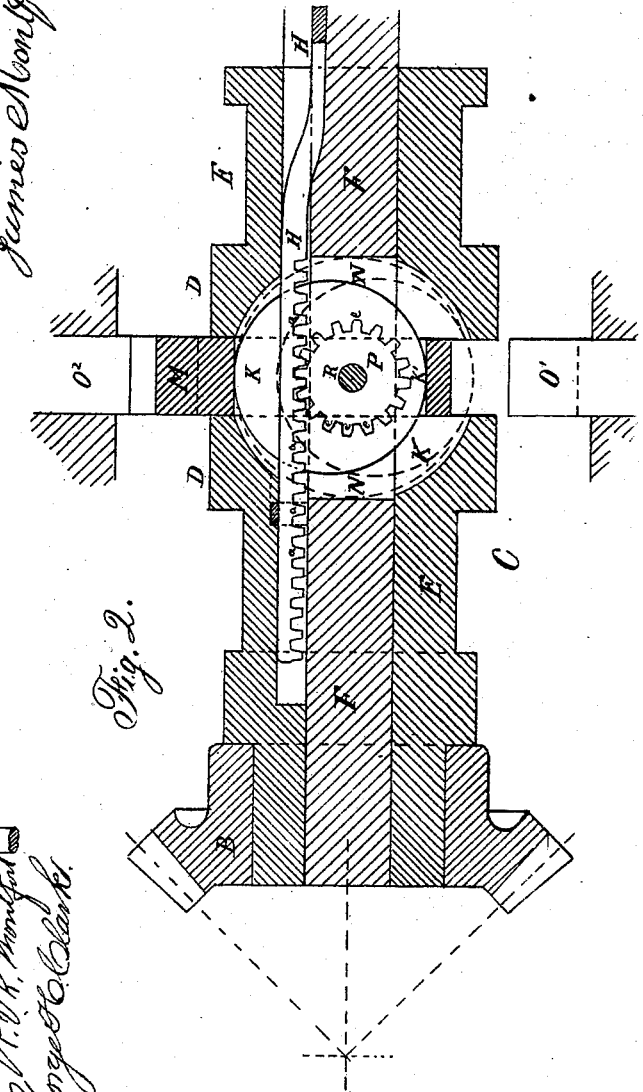

Figure 1 represents the arrangement of the cut-off in connection with the governor. Fig. 2 is a longitudinal section, and Fig. 3 is a cross-section of the essential parts of the cut-off rigging in larger scale.

The nature of my invention consists in the arrangement of an eccentric inside a cam, which lifts the steam-valves in such a way that the change of position of the eccentric changes the throw of the cam and with it the lift of the valves, said eccentric being on the same spindle with a spur-pinion, which is turned either way by a rack on a rod connected direct with the governor, and which is turned by the action of the governor. The action of the cam is the same as an eccentric-strap over an eccentric, with the difference that, in this case, the plane in which the cam moves is vertical to the plane of movement of the eccentric.

In Fig. 1, C represents a hollow vertical spindle, which is held in its position on the steam-cylinder in the bearings of a cam-box, E E being the journals on which the whole spindle with the governor attached revolves, and A B representing a pair of miter-wheels, by which the spindle is moved through a shaft, A′, which again receives its motion from the crank-shaft of the steam-engine by gearing in such a way that the governor makes one revolution with every one revolution of the crank-shaft. The center part of the spindle C contains the cut-off rigging; and the toes $O^1$ $O^2$, which are attached to the valve-stems on either side of the spindle, and guided in bearings T T, are placed in such positions that the adjustable cam M will move them, and with them the valves, enough to admit the least quantity of steam necessary when the cam M has the least throw or when the governor has the highest speed, but which will also move as much as is required when the cam has full throw or when the governor runs slow at the commencement of its action. The cam M itself is a flat steel plate of suitable thickness, and shaped in a suitable way, so that one rounded corner, M′, is the part which lifts or moves the toes Q Q with the flat face. The back or rounded part is made so as to close the valves easy when the cam M leaves the toes Q Q in its rotary motion. This cam M has an oblong slot through its flat sides to admit the square governor-spindle F F and to allow the cam as much movement sidewise as the throw of the cam is varying from the smallest to the largest throw. The cam is fitted nicely over the spindle F, so that no lost motion sidewise may occur. Another slot, N N, is cut lengthwise right through the center of the governor-spindle F F, and in this slot N is placed an eccentric, K, on a pin, R, running crosswise through the spindle F. The eccentric K K consists of two flat plates, and between them a spur-pinion, P, fastened strongly to each. The throw of the eccentric around the pin R is at least the same as the difference in the throw of the cam from its lowest to its highest lift of the valves, or more. In the first case the eccentric has to make a full half turn to move from one extreme to the other. In the second case the eccentric has only to move a part of the way to have the same effect. The slot N is long enough to allow the eccentric K to swing around the pin R and give the required change of throw, and the plane in which the eccentric K moves is vertical to the plane of movement of the cam M. The pin R is exactly in the center of the thickness of the cam, and the slot in the same is enlarged lengthwise so as to allow the eccentric to lay in the cam, so that the outer diameter of the eccentric touches each end of the slot in whatever position the eccentric may be, the thickness of the cam M being larger than the throw of the eccentric to prevent slack motion of the eccentric. This is necessary to enable this cut-off rigging to be attached to either kind of governors which lift the spindle up by increasing speed or push the center spindle down, as the eccentric can work either way; but when only a certain kind of governor is to be used in connection with this cut-off the thickness of the cam can be reduced on the side opposite to which the eccentric is turning. Between the two eccentric-plates K K moves a rod, H, vertically up and down, with teeth *a a a* on the inside face which gear into the teeth *c c c* of the spur-pinion P. This rod H is connected to the sliding cross-head S of the governor and is moved by this cross-head when the governor operates.

Figure 3:
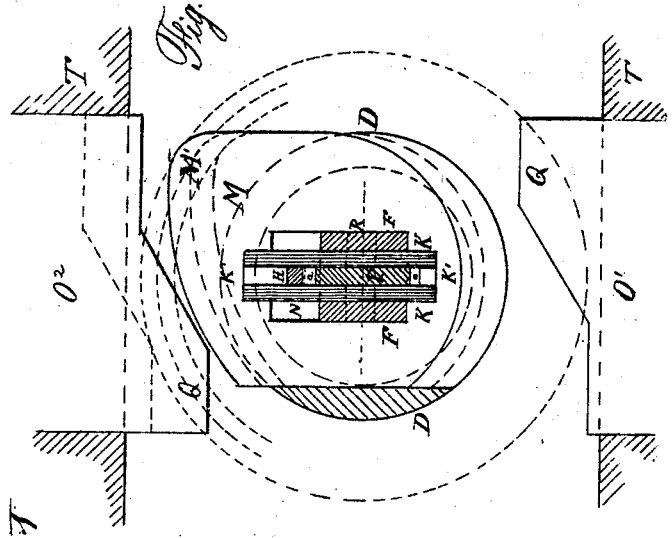

When the balls of the governor are down—that is, when the speed is slow—the rod H is pushed down and the eccentric K is in a position as shown in full lines, Figs. 2 and 3, when a governor is used like the one represented, pushing the cam M out to the full extent to lift the valves as high as possible; but when the speed increases and the sleeve S rises the rod H is pulled up, and by it the eccentric K is turned by means of the pinion P. The eccentric moves around the center R upward and shifts the cam M toward the center of the spindle and decreases the lift of the valves. When the regular speed is reached the eccentric should stay about half way—that is, the most eccentric point should stay up or down in the center of the spindle F. In this position the least change in the speed or the least movement of the rod H will have the greatest effect on the eccentric and through it on the cam M, and in this way the sensibility of the cut-off is considerably increased and a great advantage established of this arrangement over other cut-offs. The sensibility of the adjustable movement of the cam depends also on the size of the pinion P. A small pinion will make the eccentric move quicker, when the movement of the sleeve of the governor is the same, than a large one, and a larger pinion needs more change in the movement of the rod H to have the same effect than a small one. If the pinion P is placed a little eccentric on the pin R and under ninety degrees to the eccentricity of the eccentric K, so that the rack a a a works on the shorter side of the pinion when the governor runs its regular speed, the sensibility of the cam is by this also increased, and it requires only the rod H to regulate itself to the shorter or longer side of the pinion in its up-and-down movement. The shape of the toes Q Q in relation to the shape of the cam can be so arranged as the circumstances require. The closing of the valves can be done quick or slow. The opening of the valves increases in velocity with the cam being moved out further from the spindle, and decreases as soon as the cam is being drawn in; but the time the valve commences to open is always the same; by every revolution it may be opened much or little.

I will point out a few advantages of this cut-off rigging over many others: The movement of the governor is positive, and any kind of governor can be used to connect with the rod H, the motion of which with the rack attached is also positive. The pinion and the eccentric being strongly fastened together transfer the rotary motion to a reciprocating motion of the cam, which by this motion regulates the opening of the steam-valves. All resistances back from the toes on the valve-stems toward the center of the governor-spindle are square. At the moment of opening the valve the resistance is taken up by the square governor-spindle and by the flat side of the eccentric, which is also held by the square spindle, and both are held by the bevel-gearing at the bottom of the cam-spindle. No back pressure can bear from the pinion to the rack and to the rod H connected to the governor, so that there is no tendency to disturb the regular and free motion of the governor outside the speed of the engine. All parts are simple and substantial; but the main point of all is the increasing effectiveness and sensibility of the cut-off at the time when it is most needed—that is, at the time when the engine is running at its regular speed. The least change of speed will be quicker regulated at that point on account of the position of the eccentric in the cam at that moment.

What I claim as my invention, and desire to secure by Letters Patent, is—

The arrangement of the pinion P firmly attached to the eccentric K and working in the same plane with the eccentric, the whole situated inside a cam, M, which works the valves, and which is regulated by the action of the governor on the pinion P by means of the rod H and rack a a a, making the cut-off variable, as specified.

JAMES MONTFORT.

Witnesses:
R. V. K. MONTFORT,
G. F. BOYD,
GEORGE H. CLARK.